United States Patent [19]

Visconti

[11] Patent Number: 6,056,293
[45] Date of Patent: *May 2, 2000

[54] SEALING ASSEMBLY FOR A ROTARY SHAFT, IN PARTICULAR OF AN AUTOMOTIVE ENGINE WATER PUMP

[75] Inventor: Alberto Visconti, Varese, Italy

[73] Assignee: RFT S.p.A., Torino, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/982,361

[22] Filed: Dec. 2, 1997

[30] Foreign Application Priority Data

Dec. 3, 1996 [IT] Italy ................ TO960244 U

[51] Int. Cl.[7] ........................................ F16J 15/32
[52] U.S. Cl. .................. 277/551; 277/402; 277/560; 277/565
[58] Field of Search .................. 277/402, 549, 277/551, 560, 562, 565, 571

[56] References Cited

U.S. PATENT DOCUMENTS

| | | |
|---|---|---|
| 3,005,648 | 10/1961 | Christensen . |
| 3,396,977 | 8/1968 | Iguchi . |
| 3,854,734 | 12/1974 | West . |
| 4,448,461 | 5/1984 | Otto . |
| 4,799,808 | 1/1989 | Otto . |
| 4,822,055 | 4/1989 | Hogan . |
| 4,991,982 | 2/1991 | Colanzi et al. . |
| 5,201,528 | 4/1993 | Upper . |
| 5,244,215 | 9/1993 | Cather, Jr. et al. . |
| 5,582,412 | 12/1996 | Sabo Filho . |
| 5,588,656 | 12/1996 | Matsushima . |

FOREIGN PATENT DOCUMENTS

| | | |
|---|---|---|
| 458123A | 11/1991 | European Pat. Off. . |
| 1531683A | 11/1968 | France . |
| 2113557A | 9/1972 | Germany . |
| 2263141A | 7/1993 | United Kingdom . |

*Primary Examiner*—Anthony Knight
*Assistant Examiner*—John L. Beres
*Attorney, Agent, or Firm*—Collard & Roe, P.C.

[57] ABSTRACT

A sealing assembly for a pump shaft, having a metal supporting structure, and a sealing ring in turn having a main sealing lip and a secondary lip, which extend axially in opposite directions and define an annular cavity together with a lateral surface of the shaft. When undeformed, the diameters of the two lips are such as to respectively determine a predetermined amount of interference and a radial clearance with the shaft. The sealing ring is so formed as to be deformed elastically by the interference fit between the main lip and the shaft, so as to cause the secondary lip to cooperate with the shaft with substantially no interference. The secondary lip is defined between two annular sides converging with each other to form a sealing edge towards a lateral surface of the shaft; and the side located on the opposite side to the annular cavity is defined by an oblique annular surface defining in radial section an acute angle with the shaft so as to receive, in use, a sufficient radial thrust to raise the secondary lip slightly and allow fluid to leak into the annular cavity.

5 Claims, 1 Drawing Sheet

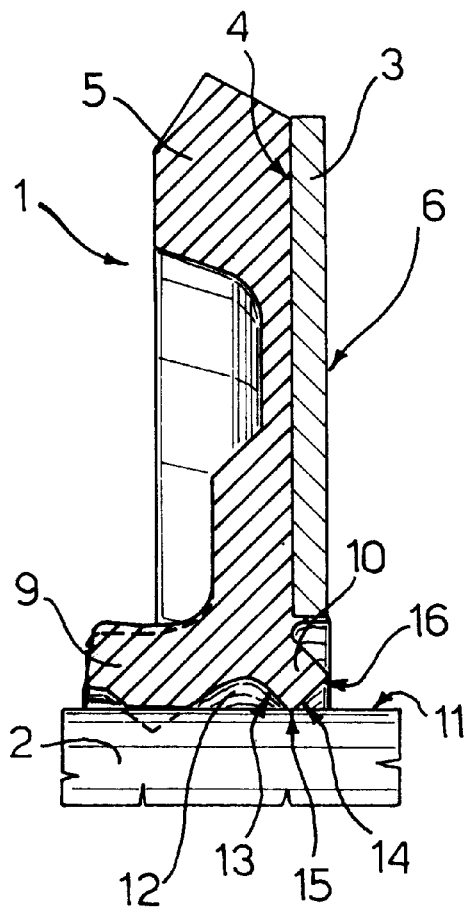
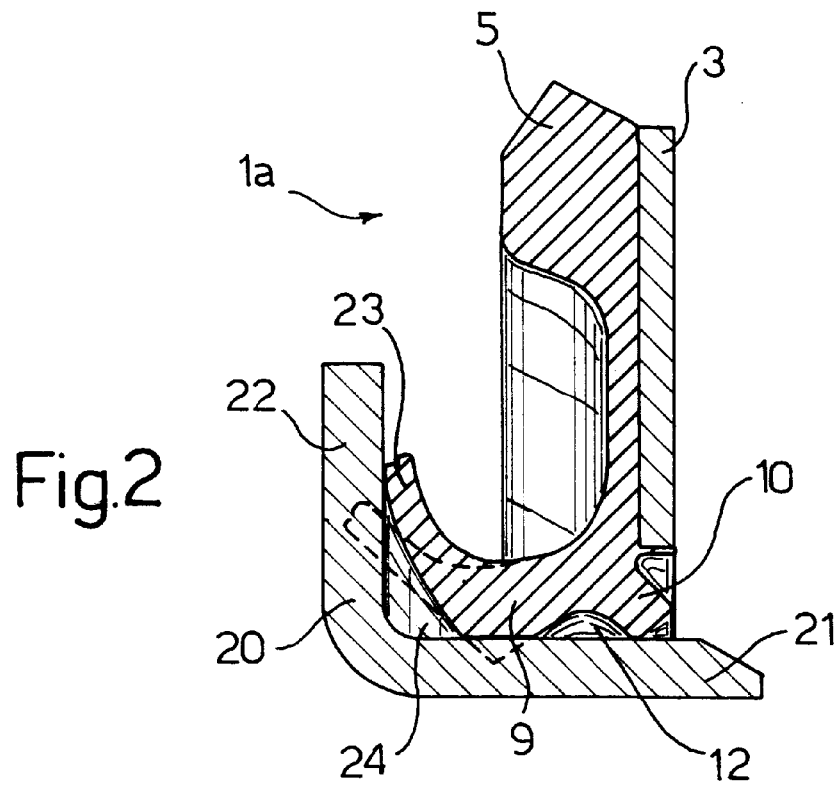

SEALING ASSEMBLY FOR A ROTARY SHAFT, IN PARTICULAR OF AN AUTOMOTIVE ENGINE WATER PUMP

BACKGROUND OF THE INVENTION

The present invention relates to a sealing assembly for a rotary shaft, in particular of an automotive engine water pump, and which is particularly suitable for fitment to a bearing supporting a rotary shaft, for example, of a pump.

Rotary shaft bearings are fitted with various types of sealing assemblies In particular, automotive water pumps, in which the sealing assembly is required to separate the grease on the ball side of the bearing from the water in the pump, are normally fitted with sealing assemblies featuring two radial sealing lips.

Though widely used, and despite the presence of a so-called "dust" lip, this type of sealing assembly fails to provide for effective protection against external pollutants. Moreover, the sliding action of the sealing lips on the rotary shaft, particularly the innermost main lip ensuring actual fluid sealing, results in overheating, deterioration and wear of the lips.

SUMMARY OF THE INVENTION

It is an object of the present invention to provide a sealing assembly for a rotary shaft, designed to eliminate the aforementioned drawbacks. More specifically, it is an object of the present invention to provide a sealing assembly ensuring effective protection against external pollutants, while at the same time reducing wear of the sealing elements.

According to the present invention, there is provided a sealing assembly for a rotary shaft, in particular of an automotive engine water pump, and comprising a rigid supporting structure; and a sealing ring carried by a first face of said supporting structure and so shaped as to comprise a first and second annular lip cooperating in sliding manner with said rotary shaft; said first and second annular lips extending axially in opposite directions, and defining a first annular cavity together with a lateral surface of said rotary shaft; characterized in that, when undeformed, said first annular lip has an inside diameter such as to mate with a predetermined amount of interference with said rotary shaft, while said second annular lip has an inside diameter such as to produce a radial clearance between itself and said rotary shaft; and in that said sealing ring is so formed as to be deformed elastically by the interference fit between said first annular lip and said rotary shaft, so as to cause said second annular lip to cooperate with said rotary shaft with substantially no interference.

More specifically, said second annular lip is defined between two annular sides converging with each other to form a sealing edge towards said lateral surface of said rotary shaft; a first of said sides, located on the opposite side to said first annular cavity, being defined by an oblique annular surface defining in radial section an acute angle with said rotary shaft so as to receive sufficient radial thrust to raise said second annular lip slightly and allow fluid to leak between said second annular lip and said rotary shaft into said first annular cavity.

In one variation, the sealing assembly according to the present invention also comprises a rigid shield integral with said rotary shaft; said rigid shield comprising a sleeve portion fitted to said rotary shaft and cooperating in sliding manner with said first and second annular lips, and a radially outer flange; said sealing ring also comprising a third annular lip extending axially beyond said first annular lip and cooperating in sealing manner with said flange.

In this case, said first annular lip and said third annular lip define, together with said rigid shield, a second annular cavity in which a predetermined amount of lubricant is inserted.

The sealing assembly according to the present invention thus ensures effective protection against external pollutants, while at the same time reducing wear of the sealing elements.

BRIEF DESCRIPTION OF THE DRAWINGS

A non-limiting embodiment of the present invention will be described by way of example with reference to the accompanying drawings, in which:

FIG. 1 shows a radial section of a sealing assembly for a rotary shaft, in accordance with the present invention;

FIG. 2 shows a radial section of a variation of the FIG. 1 assembly.

DETAILED DESCRIPTION OF THE INVENTION

Number 1 in FIG. 1 indicates as a whole a sealing assembly for a rotary shaft 2, e.g. the shaft fitted with the impeller of an automotive engine water pump.

Assembly 1 comprises a substantially annular, rigid, e.g. metal, supporting structure 3 comprising, on one face 4, a sealing ring 5 made of elastomeric material.

Sealing ring 5 is fixed in known manner (e.g. bonded during curing) to rigid supporting structure 3, and, as explained in more detail later on, is located, in use, on the inner side of the pump, while a second face 6, opposite first face 4, of rigid supporting structure 3 is located on the side facing the bearing (not shown) of shaft 2, in particular on the "ball side" of the bearing, and contacting a lubricant, e.g. grease.

Sealing assembly 1 may be located between shaft 2 and an element of the pump casing, in front of the shaft bearing, in which case, sealing ring 5 cooperates in sliding manner directly with shaft 2. Alternatively, sealing assembly 1 may be located between the inner and outer rings of the shaft bearing, in which case, sealing ring 5 cooperates in sliding manner with the inner ring of the bearing rotating integrally with shaft 2.

In the following non-limiting description, reference is made to the first of the above arrangements, though the same obviously also applies to the second, the only difference being that shaft 2, as opposed to being the actual pump shaft, is defined by the rotary ring of the shaft bearing.

Sealing ring 5 is so formed as to comprise two annular lips 9 and 10: a main first annular lip 9 extending axially inwards of the pump; and a secondary second annular lip 10 extending axially in the opposite direction to the first.

Lips 9 and 10 cooperate in sliding manner with shaft 2, and define, with a lateral surface 11 of shaft 2, an annular cavity 12.

More specifically, sealing ring 5 is so formed that the main lip 9, the undeformed shape of which is shown by the dash line in FIG. 1, has an inside diameter such as to mate with a predetermined amount of interference with shaft 2; whereas, in the undeformed condition, i.e. before sealing assembly 1 is fitted to shaft 2, the secondary lip 10 has an inside diameter such as to produce a radial clearance between itself and shaft 2.

The secondary lip 10 is defined between two annular sides 13, 14 converging with each other to form a sealing edge 15 towards lateral surface 11 of shaft 2; side 13 faces annular cavity 12; while side 14 faces away from annular cavity 12, and is defined, close to lateral surface 11 of shaft 2, by an annular surface 16 defining in radial section an acute angle with shaft 2.

In actual use, sealing assembly 1 is assembled so that main lip 9, which performs the actual sealing function, is located, as stated, inwards of the pump; while secondary lip 10 is located outwards of the pump, in front of the bearing of shaft 2, where it provides for protection against pollutants and for preventing other fluids and/or dirt from damaging main lip 9.

In the example shown, in which sealing assembly 1 is interposed between the operating fluid (water) of the pump and the lubricant (grease) of the bearing of shaft 2, secondary lip 10 contacts the lubricant on the side 14 side comprising annular surface 16.

When sealing assembly 1 is assembled, main lip 9, the undeformed shape of which, as stated, is shown by the dash line in FIG. 1, is so deformed elastically as to create a radial pressure for sealing shaft 2.

By virtue of the particular design of sealing ring 5, the interference fit between main lip 9 and shaft 2 also results in elastic deformation of secondary lip 10 and in a reduction in the radial clearance between secondary lip 10 and shaft 2, so that, when assembled, secondary lip 10 is connected to shaft 2 with substantially no interference, i.e. in such a way as to barely skim the lateral surface 11 of shaft 2.

During operation of the pump, positive pressure is exerted by the lubricant on surface 16 of lip 10, and which, on account of the inclination of surface 16, raises lip 10 to allow a small amount of lubricant to leak into annular cavity 12.

The lubricant entering annular cavity 12 acts as a further barrier for effectively preventing the passage of pollutants to main lip 9.

Moreover, the lubricant inside annular cavity 12 lubricates main lip 9, which thus slides more smoothly along shaft 2 and undergoes less wear.

FIG. 2 shows a variation 1a of the sealing assembly according to the present invention, which is particularly suitable for heavy-duty applications.

Sealing assembly 1a comprises a further rigid, e.g. metal, shield 20 integral with shaft 2, and defined by a sleeve portion 21 fitted directly to shaft 2, and by a radially outer flange 22.

Sealing ring 5 is again so formed as to comprise two lips 9 and 10, and also comprises a third lip 23 extending axially beyond the main lip 9, on the opposite side to the secondary lip 10.

Sleeve portion 21 of rigid shield 20 cooperates in sliding manner with lips 9 and 10, while flange 22 cooperates in sealing manner with third lip 23 to further improve the sealing efficiency of assembly 1a.

Together with rigid shield 20, main lip 9 and third lip 23 thus define a fluidtight second annular cavity 24.

At assembly, a predetermined amount of lubricant, preferably grease, may be inserted inside cavity 24 to act as a further pollutant barrier and reduce the wear of sealing lips 9 and 23.

Clearly, changes may be made to the sealing assembly as described and illustrated herein without, however, departing from the scope of the present invention.

I claim:

1. A sealing assembly (1) for a rotary shaft (2) in a machine, for separating an operating fluid of the machine and a lubricant of said rotary shaft, comprising a rigid supporting structure (3); and a sealing ring (5) carried by a first face (4) of said supporting structure (3), said sealing ring so shaped as to comprise first (9) and second (10) annular lips cooperating in sliding manner with said rotary shaft (2); said first (9) and second (10) annular lips extending axially in opposite directions and defining a first annular cavity (12) together with a lateral surface (11) of said rotary shaft (2);

said sealing assembly being interposed between a first chamber containing said operating fluid of the machine and a second chamber containing said lubricant; said first lip (9) extending axially toward said first chamber containing said operative fluid, said second lip (10) extending axially toward said second chamber containing said lubricant;

wherein, when undeformed, said first annular lip (9) has an inside diameter such as to mate with a predetermined amount of interference with said rotary shaft (2), while said second annular lip (10) has an inside diameter such as to produce a radial clearance between itself and said rotary shaft (2); and wherein said sealing ring (5) is so formed as to be deformed elastically by the interference fit between said first annular lip (9) and said rotary shaft (2), so as to cause said second annular lip (10) to cooperate with said rotary shaft (2) with substantially no interference.

2. A sealing assembly (1) as claimed in claim 1, wherein said second annular lip (10) is defined between two annular sides (13,14) converging with each other to form a sealing edge (15) towards said lateral surface (11) of said rotary shaft (2); and a first (14) of said sides, located on the opposite side to said first annular cavity (12), being defined by an oblique annular surface (16) defining in radial section an acute angle with said rotary shaft (2) so as to receive sufficient radial thrust to raise said second annular lip (10) slightly and allow fluid to leak between said second annular lip (10) and said rotary shaft (2) into said first annular cavity (12).

3. A sealing assembly (1) as claimed in claim 1, further comprising a rigid shield (20) integral with said rotary shaft (2);

said rigid shield (20) comprising a sleeve portion (21) fitted to said rotary shaft (2) and cooperating in sliding manner with said first and second annular lips (9,10), and a radially outer flange (22); and said seal ing ring (5) also comprising a third annular lip (23) extending axially beyond said first annular lip (9) and cooperating in sealing manner with said flange (22).

4. A sealing assembly as claimed in claim 3, wherein said first annular lip (9) and said third annular lip (23) define, together with said rigid shield (20), a second annular cavity (24).

5. A sealing assembly as claimed in claim 4, wherein a predetermined amount of lubricant is inserted in said second annular cavity (24).

* * * * *